July 16, 1963  C. M. HARKINS  3,097,681
TIRE

Filed Jan. 25, 1960  2 Sheets-Sheet 1

INVENTOR:
CARLYLE M. HARKINS
BY
ATT'Y

July 16, 1963 C. M. HARKINS 3,097,681
TIRE
Filed Jan. 25, 1960 2 Sheets-Sheet 2
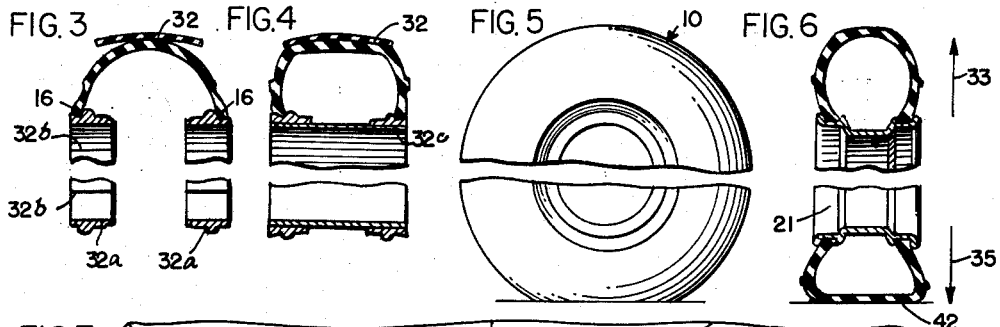
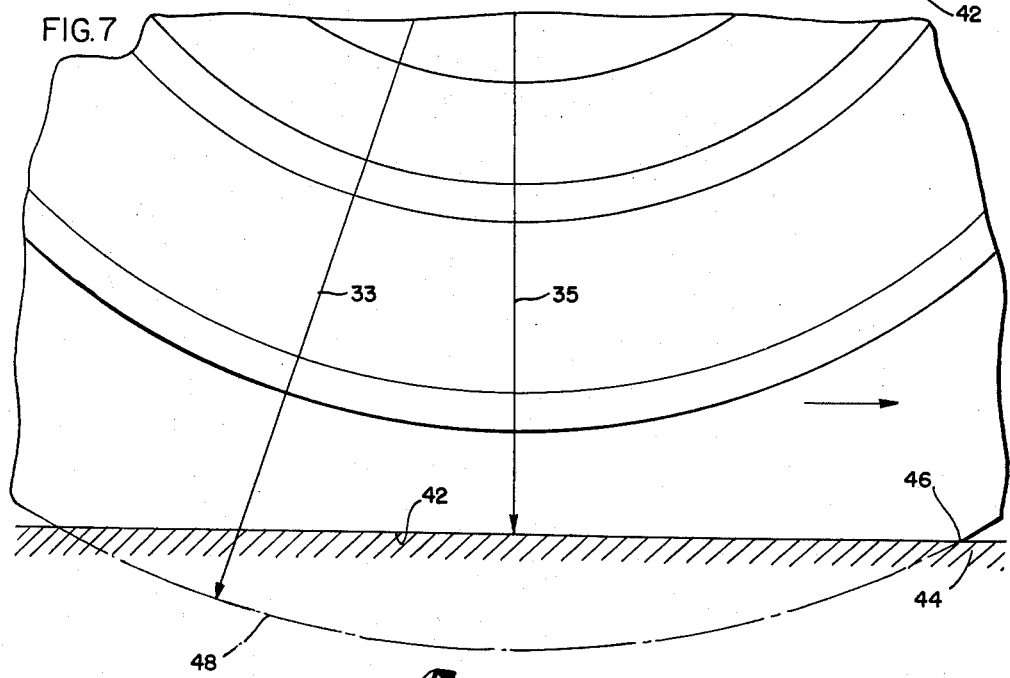
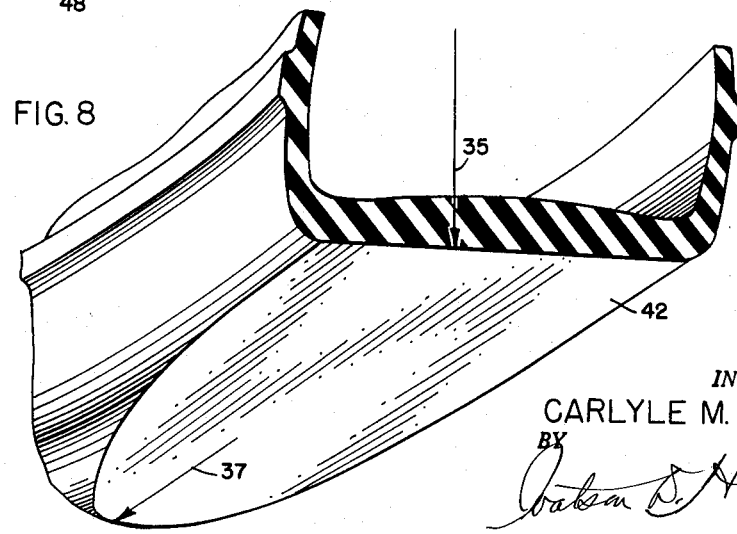
INVENTOR:
CARLYLE M. HARKINS
BY
ATT'Y

United States Patent Office 3,097,681
Patented July 16, 1963

3,097,681
TIRE
Carlyle M. Harkins, 2134 N. Hampton Court, Peoria, Ill.
Filed Jan. 25, 1960, Ser. No. 4,376
6 Claims. (Cl. 152—352)

The present invention relates to vehicle bearing wheels and to pneumatic supports for the wheels such as tires used upon passenger vehicles, trucks and the like.

Tires of the type considered here, sometimes referred to as tire casings or casings, comprise a carcass with a peripheral crown and a tread overlying the crown. In production the carcass is made up of inextensible annular beads such as wire coils at its free rim engaging edges with superposed layers of cords looped around the beads and disposed diagonally generally in alternately crossing relationship across the crown. The coils and cord are then embedded as an integral assembly in a vulcanized elastomer. The carcass in a transverse radial section is thereby fashioned to be generally circular and when mounted conventionally and inflated under pressure the crown is rounded out with the pressure distending the cording against the restraints of the bead and the rim flanges in all directions generally normal to the inside surfaces of the tire.

Treads, which can be vulcanized simultaneously or applied as a retread upon the crown of the tire, are generally so shaped that they internally round with the carcass under inflation yet provide a substantially cylindrical external tread area for contact with the road. Obviously, the tread portion is thus progressively thicker from its center and is referred to in the trade as a "shoulder" or "shouldered" tread. Incidentally, the present invention embodies rounded as well as shouldered treads, preferably rounded, but also constitutes an improvement particularly in shouldered tires provided with heavy or traction cleated treads.

Thus, tires under consideration whose carcass is rounded out under pressure have a normal radius which is the radius of the tire at the center of the tread unloaded, and a static or rolling radius which is less, namely the distance from the wheel axis to the ground when loaded due to the deflection of the crown where the tread contacts the ground. The latter varies with the load, the inflation pressure of the tire and the shape of the tread on the tire carcass.

For purposes of illustrating the invention a rated wheel loading of 1050 pounds will be considered and the description will be related principally to tires used for passenger vehicles. Also for purposes of a better understanding through comparison, a conventional 7.50 x 14 four-ply tubeless type tire inflated to a pressure of 24 p.s.i. and having a normal radius of 13.6" and a rolling radius of 12.7" at such rated loading of 1050 pounds, as mounted on a conventional 5" wide rim will be used as a standard for comparison. Such are found in current tire specification charts of the major tire manufacturers. It is understood however, that the invention relates to other and like pneumatic tires of all sizes.

In conventionally mounted tires, particularly of the shoulder tread type, the overhang of the side walls beyond the bead line reduces the radially effective areas of applied air pressure for vehicular support and the pressure in the tire must be raised high enough to prevent bulging of the side walls beyond a close limit in order to prevent overheating and tire damage. The greater the pressure, the heavier and stiffer the side walls must be to withstand the pressure. Also, the wider the tread the thicker and stiffer are the shoulders of the tread and the harder is the ride of the tire due to the mass of rubber stock at the shoulders. This is pointed out in Hawkinson No. 2,303,164. Moreover, many tires, such as nylon corded tires, take a temporary set when parked for any length of time and feel bumpy for a short period of their resumed use.

On the other hand, I have discovered that if the average load upon a wheel in pounds is divided by a working tire inflation pressure of 8 or 9 pounds and this is taken as a dividend to be divided by the diameter of the wheel rim in inches, the optimum distance between the tire flanges on the wheel rim will appear as the quotient in linear inches. With the conventional 7.50 x 14 tire this would be around 8.5". Even if the 7.50 x 14 tire were so mounted it would accomplish many of the advantages attained by the invention. However, its rolling radius would be substantially reduced and, inter alia, tread waves or bulges develop and in the tire heat would be generated under working loads. Therefore, a tire carcass of the same bead diameter as the rim is selected whose conventionally rated sectional diameter would be approximately the same or a little larger than the above quotient of 8.5" and whose newly acquired rolling radius will be the same as the conventional 7.50 x 14 tire but less than its normal rolling radius, is preferably the sized tire to be mounted on the wheel. A 9.00 x 14 or 9.50 x 14 tire carcass as conventionally measured would be preferred. When such is mounted the sum of the overhang of both sides of the tire beyond the plane of the rim flanges is about one-tenth of said quotient. Because of this the side walls are almost flat and permit inward flexing at the tread without heat. Moreover, in view of the reduced pressure the number of plys may be minimized for improving flexing conditions and temporary flattening is eliminated. The tread however is vulcanized at approximately its newly determined rolling radius.

Such a carcass is preferably provided with a substantially shoulderless tread whose overall working width or girth though tapering at the sides is as wide as the rim between the wheel flanges and thicker in the middle than on the sides when the tire is uninflated or flattened by road contact at the pressure mentioned. The tread rubber is cured at a radius which would be considered to be the rolling radius of a tire approximately twenty percent less in diameter as where a 9.50 x 14 tire tread would be cured at the expected rolling radius of 12.7" of the conventional 7.50 x 14 tire. Although during curing of the tread there would be some external convexity due to the extra thickness of stock at the center of the tread, the substrate carcass and diagonally biased cording below the tread at the 12.7" radius is preferably almost cylindrical or straight across with the edge of the tread stock feathering rapidly into the side walls. Preferably the rim upon which the tire is cured should be at least the same width as the vehicle wheel rim or as much as 20% more. Also the beads of the tire should match in shape the rim structure and rim flanges supporting them so that they will snug tightly and squarely on the wheel rim when mounted thereon. In fact, as a further safety factor a snap-rim having grooves receiving the tire beads has been employed quite successfully particularly when mounting the tires on the rim. Otherwise, the cord and bead structure may be like that in the present conventional shoulder tires, it being preferred however that the cord ply rating be minimized even as low as two ply particularly if the cording is wire.

Thus, the tire in its uninflated or resting condition on the wheel looks like an oversized, wall-bulging shoulder treaded semi-flat tire, but when inflated to the poundage mentioned, the walls straighten to a slight convex curvature and the tread rounds out to a corner with the major portion of the tread material stretched under circumferential tension.

In this connection it may be well to note that although it is preferred to have all of the tread under tension, the desire is to have the rolling radius in the curing process so determined that the major portion of the tread at its mid-portion is under mild tension or unstressed when disposed at its rolling radius by loaded contact with the road. The wide spread mounting of the beads of the tire permit the curing radius to approximate the rolling radius thus indicated. Additional advantages of fuel economy and greatly increased road contact area under braking and acceleration conditions are accomplished.

With the expected load on the tire and wheel, the bottom of the tire flattens deeply without the sides bulging appreciably, thereby confining the flexure essentially to the tread where it can be cooled by contact with the road and churns the air at low pressure in heat exchange contact with wheel metal over a wide rim area. If the rim is made of aluminum heat is radiated most rapidly away from the tire. Moreover, the rolling radius will vary, it will increase by the tire distending towards the ground if the load is lightened and also if there is a tendency for the tire to leave the road by a deflection as much as two inches, the tread will still maintain contact with the road, yet the tire when engaging a bump will not bounce appreciably but merely momentarily form around or across the bump and sustain the load with further increase of contact area around the bump with an action which could be described as a mild mushing action, an action heretofore avoided because it has become associated with damage to an underinflated or "soft" tire whereas with the present invention, the so-called under inflation is put to good use, without danger of a "weaving" on the road that is generally experienced with conventional tires that are under inflated.

A further observation should be made in relation to the objects and advantages of the invention that tires embodying the invention may be run cross-wise over the ends of the ties in a railroad track at any speed and no vibration is experienced due to the fact that the low compression of the tires dampens reaction movement when subjected to its expected load. The inherent frequency of bounce or vibration, sometimes referred to in some instances as a "treading" action, is so low with respect to the weight imposed on the tire as to be without significance, particularly at high speeds where shimmy and "treading" may otherwise occur.

Moreover, the tires operate quietly because there is little if any tread rubber under compression to create compression noises such as "squeals" occurring where tread rubber on conventional tires is under compression at the road surface and under high inflation pressure capable of sustaining vibrations.

Many other advantages flow from such a wheel arrangement including easier steering, a sense of floating on air, less skidding in wet or icy weather, and a longevity of the automobile and its suspension system which is unexpected in view of past experience with "soft" tires.

Moreover, it is to be noted that the narrower the rim with conventional tires, the higher the inflation pressure required regardless of tread width and the greater the danger of blow-outs and tire damage. With the ultra low pressures of the present invention, blow-outs are minimized. Unexpectedly it has also been found possible to return the wheels of an automobile to the road pavement safely after they had dropped off the edge onto a low shoulder without peeling or burning the tire and under conditions where conventional tires would peel or the car dart dangerously to the other side of the road. Furthermore, the wheel rim may be so located on conventional automobiles that the inside wall of the tire runs in the same plane as that of a conventional tire without any changes in the automobile structure yet the tread extends outwardly an extra distance as much as a couple of inches to provide the additional stability for automobiles that is afforded by "wide tracking" wheels recently introduced on the market.

Although it is difficult to explain, it appears that the silhouette of the wheel rim is similar to a piston supported by a column of air of like cross-section in the tire under pressure as though it were in a cylinder. Very little vertical pressure effects are lost against the substantially vertical side walls and the low pressure minimizes the cording required. This column of air is in turn supported on the tread contact area, the slightest inward deflection of the tread by contact with the ground constituting an area as effective as equal areas at points of deepest deflection with the total area of deflection constituting the reaction surface for the support of the column, any support by stiffness of the side walls being greatly minimized for the advantages of flexibility under low pressure and low heat effects.

Pressure in tires which will be subjected to varying loads should be increased to 11 or 12 p.s.i. as with light trucks to maintain or exceed slightly the built-in rolling radius under all expected working conditions. Operation at the lower pressures however does no harm to overloaded tires up to 25% overload, because slight further flattening rapidly increases the road area contact and resulting effective support area of the tire.

These being among the objects and advantages of the invention other and further objects include an unusually even wear for both shouldered and rounded tires; less frictional co-efficients but greater overall braking and acceleration contact particularly with slippery road conditions; increased mileage due to increased tread contact area and greater uniformity of pressure contact over the road contact area.

In the accompanying drawings like references indicate like parts throughout the several views in which:

FIGS. 3, 4, 5 and 6 are comparison views of the shape of the carcass as it is being formed, vulcanized, and the contour of the tire under working conditions;

FIG. 7 is a fragmentary side elevation enlarged over FIG. 3 to show how it would appear under load on a road; and FIG. 8 is a fragmentary perspective view as though viewing the tire from underneath transparent glass showing the road contact area of the tire tread in FIG. 1 under working conditions.

Figure 1:
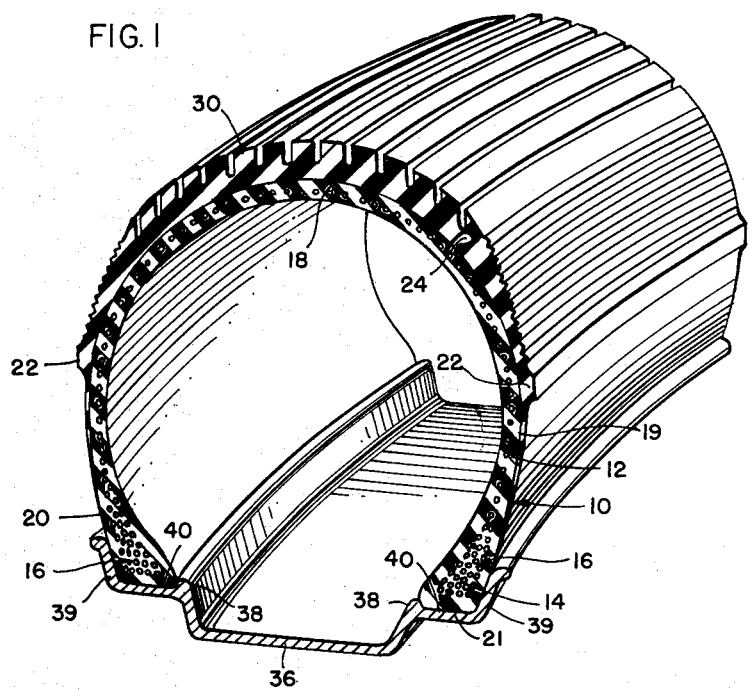
FIG. 1 is a fragmentary perspective view of a shoulderless tire embodying the invention.
Figure 2:
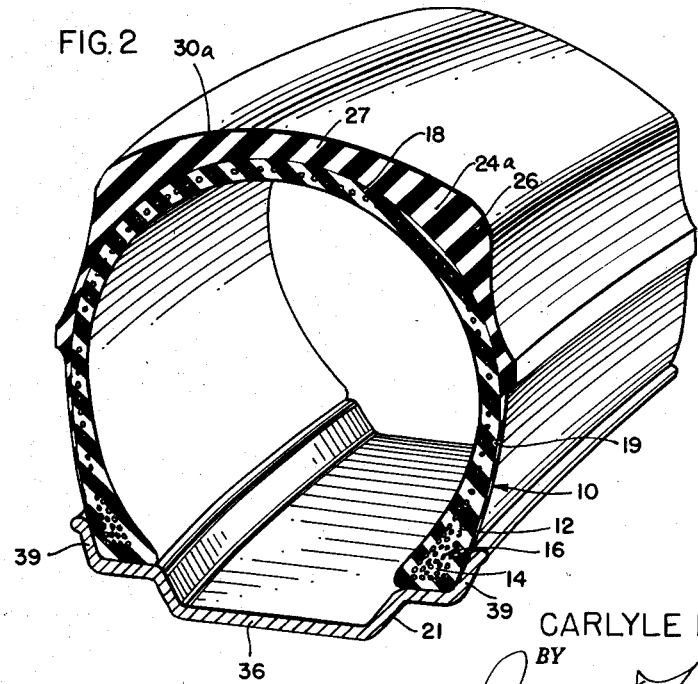
FIG. 2 is a perspective view similar to FIG. 1 showing a modified shoulder tire embodying the invention.

Referring to FIGS. 1 and 2, FIG. 1 illustrates a shoulderless type tread and FIG. 2 a shoulder type tread. In both, however, the carcass 10 comprises a plurality of layers of cording 12, in this instance two layers being shown and these cords are looped around bead wires 14 in beads 16 and diagonally across the crown 18 in crossed layers. The bead wires and cords are embedded in a resilient binding or body 19 of an elastomer, such as rubber or neoprene. The cording, shaping and thickness of the walls are such that the tire is unrestrained against outward rounding under pressure cross sectionally and circumferentially to arcs of circles respectively and full flexure is permitted throughout all elements to the extent permitted by the cording as restrained by the beads when mounted in place on a rim 21.

The crown 18 is protected by a layer of tread type rubber varying thickness beginning with a feather edge 20 at the beads 16, extending outwardly to a curb ridge 22 from which it thickens to a tread 24. In FIG. 1 the tread 24 is substantially of uniform thickness whereas in FIG. 2 a modified shoulder form is shown where the tread 24a is slightly thicker as at 26 than at the center 27. However, this thickness provides a tread area of uniform width regardless of inflation pressures whereas the rounded tread 24 provides a tire not only of varying circumferential contact area but also of a width contact area with variations in pressure and load changes. For this reason the latter is preferred, although a shoulder may permit higher pressures to be used if desired with a predetermined width of the tread engaging the ground.

The tread surface 30 or 30a of the tires may be configured any way desired as by cleat, snow tread, summer treads or cross-slitted annular ribs. Furthermore, it will be understood that the treads may be provided with the original vulcanization as an integral part of the tire or applied as retreads and vulcanized.

In this connection, reference is made to FIG. 3 in which the process of circumferentially pretensioning the tread is shown in connection with vulcanizing a tread on a prevulcanized carcass. Here again if a complete mold is used, the tires and treads can be vulcanized as a single unit. As shown in FIG. 3 bands 32a radially fractured at 32b are inserted with the openings defined by the beads 16 and the fractured segments are moved outwardly to engage the beads in bead receiving grooves to form the annular bands as shown. Thereafter the beads are drawn apart as shown in FIG. 2 to lower the crown of the carcass and a tread is secured in place and a tread vulcanizing band 32 can be slipped into place having a radius approximately 80% of the extended radius of the tire and an inflation bag (not shown) oriented in the tire cavity. Thereafter a cylindrical sleeve 32c is telescoped into the bands and the bands brought towards each other to relative positions such as shown in FIG. 4 to permit the side walls to relax enough that the internal pressure on the tread is equal over the internal face of the vulcanizing band 32. The tread is then vulcanized, the sleeve 32c removed, the fractured segments collapsed, the tire removed and then placed on a rim ready for use. The uninflated shape is shown in FIG. 4 and the inflated shape in FIG. 6.

The arrangement is such that when the tire is inflated, the tread is placed under circumferential tension preferably throughout the tread area but certainly over the expected working area under light to medium load conditions and within the expected wear depth of the tread. With this arrangement, the partly tensioned rubber bordering the working area and the fully tensioned rubber more remote therefrom in the tread area will tend to hold the tire in shape against lateral bulging at the sides of the tire yet the untensioned rubber at widest road contacting area will flatten out to engage the ground with substantially uniform application of air pressure over the deflected area. The tensioning and relaxing of the elastomer tread under these conditions generates a minimum of heat as compared with the compression and a buckling or bending action occurring with a conventional narrow rim tire.

FIGS. 5 and 6 show the relative shape and proportions of the rounded tread type tire under its free inflated radius 33 form at the top and under a deflected rolling radius 35 working condition at the bottom of the views.

In FIG. 7 the rolling radius 35 is further shown and the ground contact area preferably equals circumferentially twice the width of the tire section under braking conditions where the tire inflation pressure in p.s.i. is approximately the load in pounds divided by the diameter of the tire rim multiplied either by its rim width or the tire size in inches when they are within approximately ninety percent of each other.

The road surface contact area of such a tire as shown in FIG. 1 is illustrated in FIG. 8 where its circumferential length 37 is in excess of twice the radial thickness of the tire at its rolling radius 35.

The description is related to a 9.50 x 14 tire as conventionally rated and modified according to the teachings of the invention as mounted on a 9" wide rim to operate with a running radius of approximately 13" which is substantially that of a convention 7.50 x 14 shouldered tire. As shown in FIG. 4, the cross-sectional shape of the tire is shown with the tread cured in the shape shown, the inner wall virtually cylindrical and the outer wall appreciably convexed. The expected rolling radius is shown by the line 35 and it will be appreciated that as the beads of the carcass are widened the tread flattens and its radius is reduced by approximately 20% of the rated cross sectional diameter of the tire, thereby enabling not only a wider silhouette area for the rim for lower pressures but also a much less rolling radius than that which otherwise might be deemed advisable with conventional angular cording criss-crossed from bead to bead to permit moderate sleazing in the tread area. This sleazing is used to an advantage in the invention.

In FIG. 1 the tire is shown mounted preferably upon a 9" rim of the safety type which has a drop center 36 for receiving the beads initially for mounting the tire as bordered by annular ribs 38 on opposite sides over which the beads 16 slip or snap into grooves 40 therebeyond in snug engagement with the outwardly flared rim flanges 39. With the ribs assisting in holding the beads in place, inner tubes are not required, nor are they required without the ribs except where the tire pressure is less than 7 p.s.i. and then only as a safety factor.

Moreover, in FIG. 7 the inflated wheel is shown subjected to load conditions with the tire tread operating at the running radius with no bulge in the crown surface of the tread just ahead of the flat area 42 of contact with the road 44 as at 46. The tread material being under tension at all times in this area there is no forward crowding of tread material under the rolling action of the wheel. Furthermore, as indicated by broken lines 48 it will be seen that the tread will move outwardly to maintain contact with the road where conventional tires under bounce conditions would break contact with the road momentarily. Also, it has been observed that because the tread is under tension under operating conditions it accepts with a predesigned willingness both a laterally and longitudinally yielding to bumps, curbs and other obstructions as distinguished from the opposition to such that is present in a conventional tire having a high pressure with rubber under compression. Consequently, the tire of the present invention can climb curbs laterally easily and without darting or back-lashing the steering mechanism of the motor vehicle. Because of this there is less danger of damage to a steering mechanism when rubbing a curb.

Many conventional automobiles using 7.50 x 14 tires do not have a sufficient inside clearance for a carcass embodying the invention otherwise conventionally rated at 9.00 x 14. However, it will be appreciated that an 8.50 x 14 or 8.00 x 14 tire can be used with a little higher pressure in it on a 7½" wide rim which is in excess of 80% of the rated tire size thereon. The wheel and rim can be formed with a ½" less rim clearance on the inside and the remaining increase in rim width over conventional widths being accommodated on the outside of the wheel disc. In fact, more than a ½" increase on the inside may be permitted with some models because the clearance curve of the inside wall of the tire itself need not be shifted whereas the outer wall is the only one moved substantially with the wider rims.

Having thus described the invention and several embodiments it will be appreciated how the objects and advantages are accomplished with the present invention and how the relationship of load to size, pressure and rolling radius may be provided in other sizes of tires including truck tires without departing from the spirit of the invention, the scope of which is commensurate with the appended claims.

What is claimed is:

1. A vehicle wheel support comprising a tubeless tire having beads, a carcass with a crown portion having diagonally criss-crossed superposed layers of cords interconnecting the beads and an elastomer tread upon the crown portion integral therewith, said crown portion when inflated being free to assume cross-sectionally an outwardly rounded arc defining a lateral overall diameter and to provide a peripheral circular wheel circumference defining an expanded radius, said elastomer tread being under circumferential tension at said expanded radius and being relieved of said tension and circumferentially unstressed at the ground engaging surface thereof when loaded to a rolling radius that is reduced from the expanded radius by approximately 20 percent of said diameter, and a flanged wheel rim receiving the beads between flanges that are spaced a distance in excess of 80 percent of said diameter with the outer edges of the flanges spaced a distance less than said diameter.

2. A vehicle bearing road wheel comprising a tubeless tire casing with a peripheral crown and an elastomer tread overlying the crown and integral therewith, said tire casing having inextensible circular beads interconnected by superposed layers of diagonally crossed cords anchored to said integral beads and embedded in an elastomer to form the crown, said crown being substantially unrestrained to attain a cross sectionally rounded arcuate form defining a cross sectional diameter when the cords are distended freely by inflation, and a wheel rim having bead supporting flanges spaced from each other a distance in excess of 80 percent of said diameter but not in excess thereof and approximately equal in inches to the quotient attained by dividing the average rated wheel load in pounds by the product of nine times the diameter of the wheel rim in inches, and the material in the tread of said tire being substantially uncompressed in a peripheral direction over its ground contact area under the rated load at approximately a rolling radius that is 80 percent of said diameter.

3. A vehicle rolling road support comprising a shoulderless tubeless tire having a criss-cross corded crown, and a shoulderless tread thereon having a width substantially equal to the axial width of the crown as determined by the criss-cross cords under free inflation of the tire, the material in said tread being substantially uncompressed circumferentially over the ground contact area thereof when the tire is weight supporting at a rolling radius of approximately 80 percent of said axial width, and a rim supporting the beads of the tire at an overall spaced inside distance substantially equal to the width of the thread under a fully rated load but with an overall width less that said axial width all the way around the side walls of the tire.

4. An automobile rolling road support comprising a pressure variable inflatable shoulderless treaded tire having, a ground contact area when loaded whose square inch area is substantially equal to the quotient of the average rated load weight in pounds on the tire divided by a divisor of the inflation pressure in pounds per square inch, and a rimmed tire wheel whose silhouette area in a vertical diametrical direction is substantially equal to and located above the ground contact area of the tire when loaded, the axial width of the vertical silhouette of the wheel being substantially equal to the axial width of the shoulderless tread unloaded and, the material in the tread on said tire under load being substantially uncompressed over the ground contact area in the direction the tire rolls.

5. An automobile rolling road support comprising an inflatable shoulderless tire having a ground contact area when loaded whose square inch area is substantially equal to the quotient of the average rated load weight in pounds divided by a divisor less than 12 p.s.i. inflation gage pressure in the tire in pounds per square inch, and a rimmed tire wheel whose silhouette area in a vertical diametrical direction is substantially less than twice the ground contact area of the tire loaded, the axial width of the vertical silhouette of the wheel being substantially greater than 80 percent of the axial width of the inflated tire unloaded, and the material in the tread on said tire under load being substantially uncompressed over the ground contact area in the direction the tire rolls.

6. A replacement wheel for a tire conventionally inflated to a pressure over twenty pounds comprising, a flanged wheel rim of an axial width between its flanges greater than the internal cross sectional diameter of said tire, a casing having beads engaging said flanges and interconnected by a criss-cross corded carcass substantially unrestrained to define a crown of cross sectionally arcuate form defining a diameter when the cords are freely distended by inflation of less than 12 p.s.i., the cross sectional diameter of said arcuate form exceeding said width by less than twenty percent thereof, and an elastomer tread on said crown substantially uncompressed in a peripheral direction at a rolling radius equal to the rated rolling radius of said tire, said tire being inflated to a pressure in pounds per square inch less than 12 p.s.i. that is the quotient approximately of the wheel load in pounds divided by the diameter of the tire rim multiplied by the rim width in inches when said rim width and the tire size rated in inches are within approximately ninety percent of each other.

References Cited in the file of this patent
UNITED STATES PATENTS

| | | |
|---|---|---|
| 1,201,282 | Fisher | Oct. 17, 1916 |
| 1,382,718 | Egerton | June 28, 1921 |
| 1,643,514 | Palmer | Sept. 27, 1927 |
| 1,969,088 | Maranville | Aug. 7, 1934 |
| 2,037,640 | Macmillan | Apr. 14, 1936 |
| 2,237,819 | Hawkinson | Apr. 8, 1941 |
| 2,751,959 | Blomquist | June 26, 1956 |
| 2,822,016 | Billingsley | Feb. 4, 1958 |